United States Patent [19]
Rochkind

[11] Patent Number: 6,161,129
[45] Date of Patent: Dec. 12, 2000

[54] UNLISTED ADDRESS MESSAGING SYSTEM

[75] Inventor: Mark Meier Rochkind, Morristown, N.J.

[73] Assignee: AT&T Corp., New York, N.Y.

[21] Appl. No.: 08/941,502

[22] Filed: Sep. 30, 1997

[51] Int. Cl.⁷ .............................. G06F 12/02; G06F 15/16
[52] U.S. Cl. ........................ 709/206; 709/204; 709/205; 709/207; 709/229
[58] Field of Search ..................................... 709/204, 205, 709/206, 207, 229

[56] References Cited

U.S. PATENT DOCUMENTS

| | | |
|---|---|---|
| 4,718,005 | 1/1988 | Feigenbaum et al. . |
| 5,459,717 | 10/1995 | Mullan et al. . |
| 5,555,426 | 9/1996 | Johnson et al. ..................... 395/200.36 |
| 5,781,550 | 7/1998 | Templin et al. . |
| 5,822,526 | 10/1998 | Waskiewicz ............................ 709/206 |
| 5,832,221 | 11/1998 | Jones .................................. 395/200.36 |
| 5,835,087 | 11/1998 | Herz et al. . |
| 6,061,789 | 5/2000 | Hauser et al. . |

OTHER PUBLICATIONS

Chaum, David, "Untraceable Electronic Mail, Return Addresses, and Digital Pseudonyms", Communications of the ACM, vol. 24 No. 2, Feb. 1981.

*Primary Examiner*—Zarni Maung
*Assistant Examiner*—Almari Romero
*Attorney, Agent, or Firm*—Morgan & Finnegan, L.L.P.

[57] ABSTRACT

A messaging system is arranged to substitute an alias address for the real address of a messaging subscriber with an unlisted address thereby allowing the subscriber to be known and yet to maintain the privacy and confidentiality of the unlisted address while enabling the subscriber to a) transmit messages to targeted recipients, b) receive reply messages and other types of messages from these recipients, and c) receive spontaneous messages from others with knowledge of the alias address. The messaging system, which may be communicatively coupled to a communications carrier network, comprises a mailbox system for transmitting and receiving messages and a routing database to manage the use of alias addresses.

36 Claims, 5 Drawing Sheets

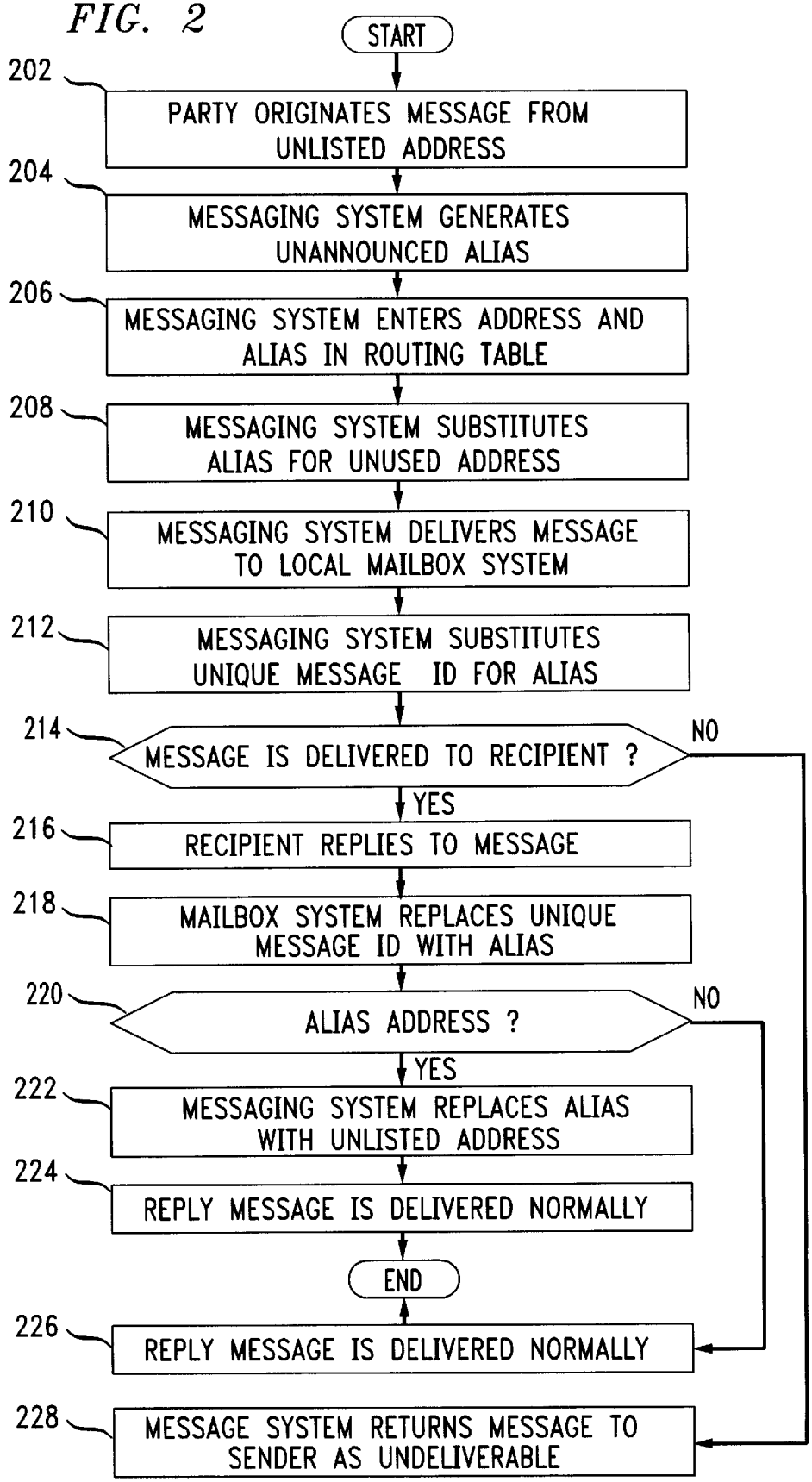

UNLISTED ADDRESS MESSAGING SYSTEM

TECHNICAL FIELD

This disclosure relates to communications system, and more specifically to a method and a system for providing messaging services to parties with unlisted addresses.

BACKGROUND

Over the last few years, communications-based messaging service, such as voice mail and electronic mail, has enjoyed tremendous commercial acceptance to the point of becoming a standard business communications method. The commercial success of messaging service has motivated service providers to offer additional features with such service. These features include spontaneous voice mail, message forwarding, and message broadcasting, to name a few. Of particular significance is the spontaneous voice mail delivery service which prompts a caller to record a message for delivery to a called party who is either unavailable or busy on another call.

The significant technological advances in the communications-based messaging field, however, have not successfully addressed the needs of privacy-conscious messaging service users. Specifically, those users have been reluctant to sacrifice their privacy in order to take advantage of the rich set of features offered by messaging service providers. This is due to the fact that a messaging system, especially a network-based messaging system, almost always requires the sender's coordinates (e.g., sender's address, sender's identification number, etc.) for all but the most basic message service delivery. Unnecessary disclosure of personal information is, of course, anathema to privacy-conscious and/or security-conscious users who do not wish their coordinates to be known to targeted recipients of their messages and much less to secondary recipients to whom such messages may be forwarded.

Message service providers assert that message senders coordinates are needed for a variety of reasons or functions which include billing, ability to notify the sender that a message is undeliverable, not to mention providing the recipient of the message with a sender's return address for the purpose of sending a reply. Yet privacy-conscious messaging service users want the capability of keeping their address undisclosed to selected recipients of their voice mail messages while taking full advantage of the features afforded by modem communications-based messaging systems. In an attempt to find a solution to this problem, some electronic mail (hereinafter referred to as "e-mail") providers have implemented a system that allows a user to obscure his or her identity while sending messages to one or more targeted recipients. Unfortunately, these e-mail messaging systems aim at allowing anonymous senders to conceal their identity from targeted recipients.

SUMMARY

I have realized that some messaging system users who may not wish to remain anonymous are nevertheless concerned about the privacy of their messaging address. The present disclosure is directed to a messaging system that allows a messaging service user with an unlisted addresses (such as a telephone numbers) to a) receive from senders, original messages as well as messages that are replies to previously transmitted messages, and b) send to targeted recipients, messages that can be easily forwarded to other recipients, and to which such recipients may reply without revealing the senders' unlisted address.

In an embodiment of the principles disclosed herein, a messaging system automatically maps an alias address to the unlisted, real address of a messaging service subscriber before delivering the subscriber's message to one or more targeted recipients. The message that is received by the recipient(s) from a subscriber whose identity is disclosed in the header of the message and/or the message itself, may include the alias address of the subscriber thereby allowing the recipient(s) to direct a reply message to the subscriber or to forward the received message to other messaging service subscribers who may also reply to the message of the original sender. Upon receiving a reply message from the recipient(s), the messaging system translates the alias address indicated in the reply message to the real address of the subscriber thereby enabling delivery of the reply message to the subscriber.

A messaging system that implements the principles disclosed herein may be comprised of a mailbox system for transmitting and receiving messages and a routing database containing a routing table. The routing database may be owned and managed by a Trusted Third Party, such as a communications carrier operating a network to which the messaging system may be communicatively coupled.

Upon receiving appropriate instructions from a subscriber, the messaging system generates an alias address and creates a record in its routing table for the alias address and the subscriber's real address hereinafter referred to as the subscriber's unlisted address. Alternatively, the record may also include an expiration date for the alias address. Once the record is created, the messaging system (through a conventional table look-up procedure) replaces the alias address with the subscriber's unlisted address for all messages originated by the subscriber and transmitted to the messaging system for delivery to a recipient. Conversely, the messaging system replaces the alias address with the real address for all messages received by the messaging system and destined for the subscriber.

A messaging service subscriber may request that the messaging system associate more than one alias address with his or her unlisted address thereby enabling the messaging system to reveal different ones of these alias addresses to different messaging recipients. The messaging service subscriber may request from the messaging system discontinuation of the use of any of these alias addresses at any time. Once the messaging system discontinues use of an alias address at the subscriber's request, all messages addressed to that alias address would be designated undeliverable and would be returned to the sender as undeliverable. Moreover, the messaging service subscriber may request that the messaging system associate different privileges with different ones of the alias addresses. For example, the messaging system may or may not reveal the alias address to a recipient of a message transmitted by the subscriber. Similarly, the messaging system, at the subscriber's request, may indicate to a recipient of a message that has been transmitted by the subscriber, that all replies to such a message would be marked undeliverable and returned to the recipient.

Finally, a subscriber who is issued an alias address may wish the alias address to remain unannounced to message recipients. This may be accomplished, for example by the mailbox system replacing the alias address with a "one-time-use" unique message ID for the alias address before checking the message to the recipient. The unique message id is inextricably associated with both, the message and the specific intended recipient(s).

BRIEF DESCRIPTION OF THE DRAWINGS

The details of the present disclosure, both as to its structure and operation, can best be understood by referring to the accompanying drawings, in which like reference numbers and designations refer to like elements.

FIG. 1b is a more detailed block diagram of a messaging system, as shown in FIG. 1a;

FIG. 2 is a flow diagram of an unannounced alias address messaging process, in accordance with one aspect of the principles disclosed herein;

DETAILED DESCRIPTION

Figure 1A:
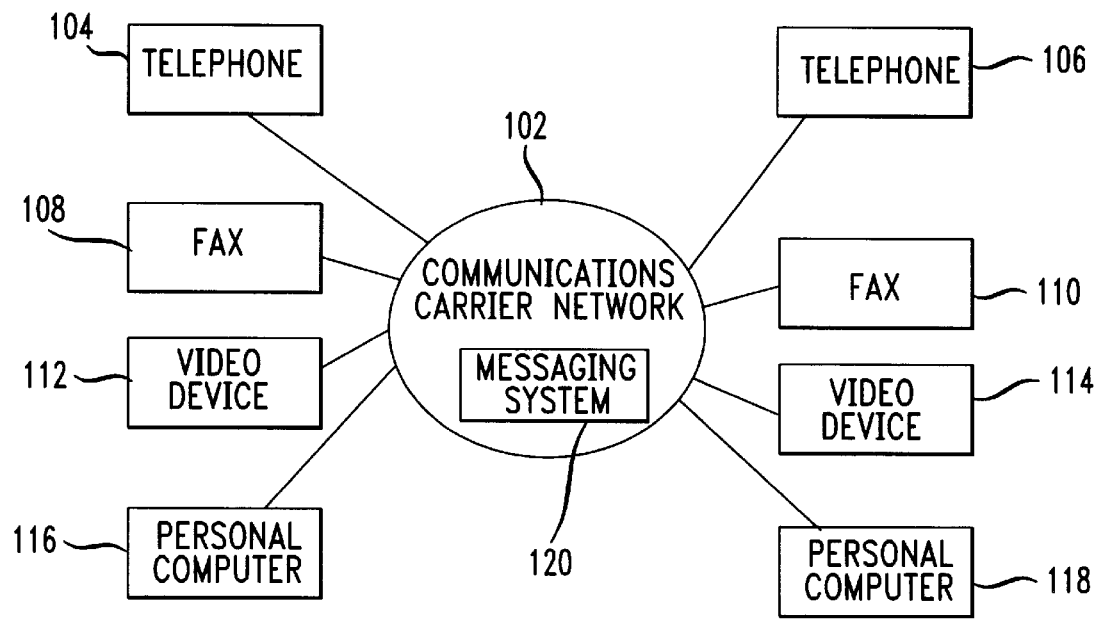
FIG. 1a is a block diagram of a communications carrier network, in accordance with the principles of the present disclosure.

A communications carrier network 102 is shown in FIG. 1a. A variety of communications devices are connected to network 102 and intercommunicate through network 102. For example, devices such as telephones 104 and 106, fax machines 108 and 110, video devices 112 and 114, and personal computers 116 and 118 are connected to network 102. These devices communicate with each other and with other devices through network 102. For example, telephone 104 may communicate with telephone 106, or telephone 104 may communicate with personal computer 118 using voice or tone recognition or other form of prior art technology.

In many instances, direct communication between devices is not necessary, possible or desirable. For example, direct voice communication between telephone 104 and telephone 106 is not possible if telephone 106 is already in use. Direct data communication between personal computer 116 and personal computer 118 is not necessary in order to send e-mail. Direct communication between fax machine 108 and fax machine 110 is not desirable to send a broadcast fax message from fax machine 108 to a large number of other fax machines. In these situations, an in others, messaging system 120, which is included in network 102, is used to provide message services. For example, messaging system 120 may provide voice message service whenever a telephone station, such as telephone 106, is unavailable for direct communication. Messaging system 120 may provide store and forward data messaging in order to transmit e-mail from one personal computer to another. Messaging system 120 may provide broadcast messaging to transmit a facsimile message from one facsimile machine to a large number of receiving machines.

Figure 1B:
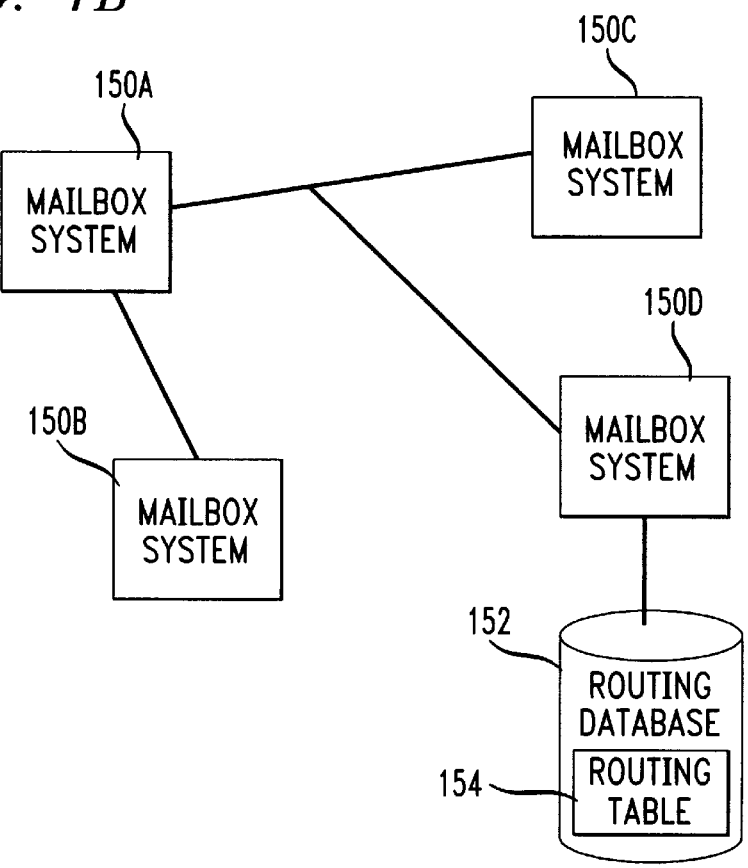

An exemplary messaging system 120 of FIG. 1a is shown in FIG. 1b. Messaging system 120 includes a plurality of mailbox systems, such as mailbox systems 150A–D and a routing database 152. Mailbox systems 150A–D receive, store and transmit messages. Mailbox systems 150A–D are communicatively connected to each other, either directly, such as mailbox systems 150A and 150C, or indirectly, through one or more other mailbox systems, such as mailbox systems 150B and 150D connected through mailbox system 150A. Messaging system 120 is also communicatively connected to the remainder of communications carrier network 102, from which messaging system 120 receives messages and to which messaging system 120 transmits message.

Routing database 152 is communicatively connected to all the mailbox systems in messaging system 120 and is accessible by each of the mailbox systems. Routing database 152 contains routing table 154, which includes routing information used by the mailbox systems to route messages between mailbox systems and between the messaging system and the rest of network 102. As is well known in the art, a mailbox system is a computer system that provides a directory to, and stores messages for subscribers of a messaging system. Whereas the routing table is typically maintained as a centralized subsystem, copies of the routing table may be maintained in each of the mailbox systems.

Figure 3:
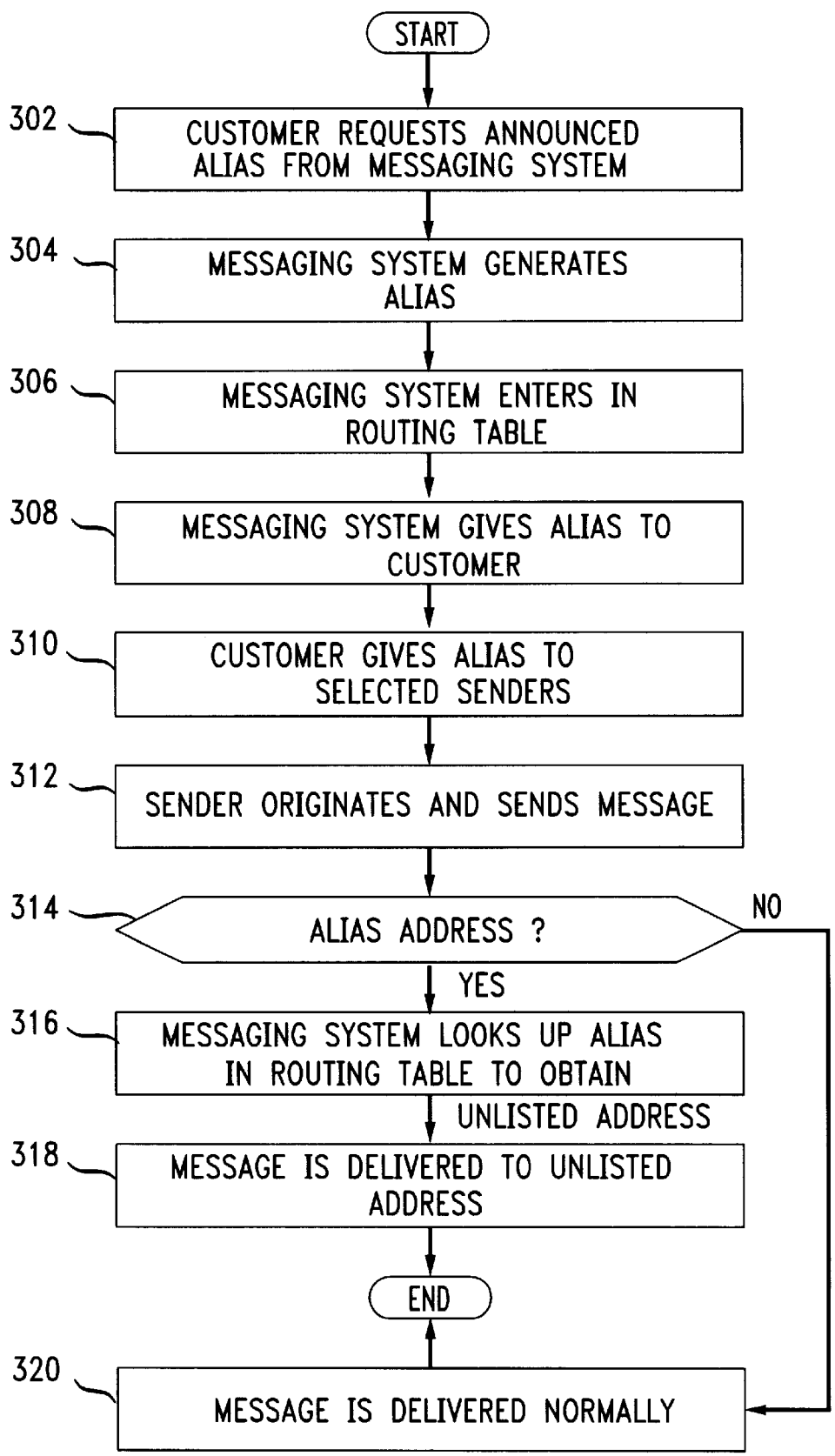
FIG. 3 is a flow diagram of an announced alias address messaging process, in accordance with another aspect of the principles disclosed herein.

FIG. 2 is a flow diagram of a process, according to the principles of the present disclosure, in which an unannounced alias address is substituted for an unlisted address in a message. An unannounced alias address is one which is created and used by the messaging system and which is not revealed to the recipient of any message with which it is associated. The process shown in FIG. 2, as well as the processes shown in FIGS. 3, 4a and 4b, is applicable to messages of any kind, such as voice, data, facsimile or video messages. The unannounced alias address is not revealed to the recipient of the message. The recipient of the message can reply to the message, but no new spontaneous messages can be sent to the sender. The unannounced alias address is typically valid for only a limited period of time. Thus, the security and privacy of the sender's unlisted address are protected, yet the sender can receive reply messages.

The process begins with step 202, in which a party having an unlisted messaging address originates a message from the unlisted address. The message includes the unlisted address of the sender. In step 204, the messaging system generates an unannounced alias address and, in step 206, the messaging system enters the unannounced alias address and the corresponding unlisted address in a routing table. In step 208, the messaging system substitutes the unannounced alias address for the unlisted address of the sender. Thus, although the recipient can only reply to the received message, the recipient cannot originate new messages destined for the unannounced alias address.

In step 210, the messaging system routes the message (carrying the unannounced alias address) to the appropriate (local) mailbox system. In step 212, prior to delivery, the unannounced alias address, which maps back to the sender of the message, is replaced with a unique message identifier. (Each unique message identifier is used only one time.) In step 214, the message is delivered to the intended recipient. If the message cannot be delivered, in step 228, it is returned by the messaging system to the sender as undeliverable. The delivered message reveals neither the unlisted address of the sender nor the unannounced alias address corresponding to the unlisted address.

In step 216, the recipient originates a reply message to the received message, using the unique message identifier as the "send to" address. In step 218, the local mailbox system encounters the unique message identifier, replaces it with the associated unannounced alias address and sends the message on its way. The alias address is recognized as such by the messaging system and the routing database is used to replace the alias address with the messaging address of the original sender. In step 220, the messaging system recognizes the alias address, and in step 222, replaces the alias address with the original unlisted address. In step 224, the messaging system delivers the reply message to the unlisted address. If the "send to" address on the message was not recognized as an alias address in step 220, the message is delivered normally as in step 226.

It is worth noting that replacing the unannounced alias address with a unique message identifier, which is used only one time, prevents recipients from recognizing that different messages may have come from the same sender. The sender may send multiple copies of the same message to the same or different recipients and may wish this fact to remain unknown. For reasons of database economy, and especially because not all messages will be replied to, one would not want to associate a different unannounced alias address with each copy of the original message.

FIG. 3 is a flow diagram of a process, according to the present disclosure, in which an announced alias address is generated for use in messaging. The party having the unlisted address (subscriber) reveals the announced alias address to all other parties from which he would like to receive messages (sender). The subscriber can receive reply messages from recipients or new spontaneous messages originated by anyone. The announced alias address may be valid for a limited period of time, which is specified by the subscriber when the alias address is generated, or the alias address may be valid indefinitely, until canceled by the subscriber.

The process begins with step 302, in which a subscriber having an unlisted address requests an announced alias address from the messaging system. In step 304, the messaging system generates the announced alias address. In step 306, the messaging system enters the announced alias address and the corresponding unlisted address in a routing table. In step 308, the messaging system gives the announced alias address to the subscriber. In step 310, the subscriber gives the announced alias address to potential senders selected by the subscriber. In step 312, one such sender spontaneously originates a new message destined for the subscriber. In step 314, the messaging system determines whether the en-route message includes an alias address. If not, then in step 320, the message is delivered normally. If so, then in step 316, the messaging system looks up the alias address in the routing table and replaces it with the unlisted address. In step 318, the messaging system then delivers the reply message to the unlisted address.

The messaging system routing table 154 will distinguish alias addresses which are announced from those which are unannounced. When an unannounced alias address is encountered by a local mailbox system during delivery, the unannounced alias address is replaced by a unique message identifier. When an announced alias address is encountered by a local mailbox system during delivery, the message is delivered and the announced alias address is displayed.

The Trusted Third Party who operates the messaging system may publish a directory which associates names with "announced alias addresses." In this way, entities with unlisted addresses can announce how they may be contacted without divulging their actual addresses. And because they can control the length of time an "announced alias address" remains effective, they can keep themselves from being contacted by others. The Trusted Third Party in the guise of the messaging system must report to those who attempt to send a message using an "announced alias address" when the linkage between an "announced alias address" and the unlisted address has been severed. After all, messages which are sent in a messaging system are expected to be delivered. Messages which cannot be delivered are returned as "undeliverable" (i.e., when the alias address is no longer valid).

Forwarding Messages

Methods of forwarding messages or preventing the forwarding of messages are well known. Thus, forwarding is typically proscribed in a voice messaging system when a received message is marked "private." Various ways of marking a message "private" or "do not forward" exist. Thus, a message may always carry a tag, indicating whether or not it may be forwarded, which can be acted upon and respected by the messaging system and the software used to implement the client interface to the messaging system.

It is noted that in certain cases, a restriction on message forwarding (aimed at preventing further distribution of the contents of a message) can be overcome by simply copying the message into a new message and sending the new message. On the other hand, in many cases, such copying is not readily accomplished and a restriction on forwarding can be effective.

The present disclosure enables the recipient of a properly forwarded message to reply to the originator of the message without knowing the address of the originator or even an announced alias address for the originator. An originator who uses an unannounced alias address to send a message, and who does not enable forwarding, can effectively restrict replies from any one other than the intended recipient(s) of the message. This is because the unique message id that is associated with the message, is usable only by the intended recipient(s) of the message.

To implement forwarding in the case of announced alias addresses, a message which is received displays the announced alias address and when forwarded continues to display this alias address so that the ultimate recipient can respond to the original sender (at the unlisted address) via the announced alias address.

Implementing the forwarding of messages with unannounced alias addresses so as to allow the ultimate recipient to reply to the original sender is problematical. A message which originates with an unannounced alias address arrives at its destination with a "unique message identifier" supplied by and known only to the local mailbox system. Were such a message to arrive with a "forwarding enabled" mark and were such a message to then be forwarded, the "unique message identifier" carried by the forwarded message would need to be replaced with the original unannounced alias address by the local mailbox system before the message can be forwarded. For this to be accomplished, the local mailbox system must recognize that the originator enabled the forwarding feature when the message was sent.

Figure 4:
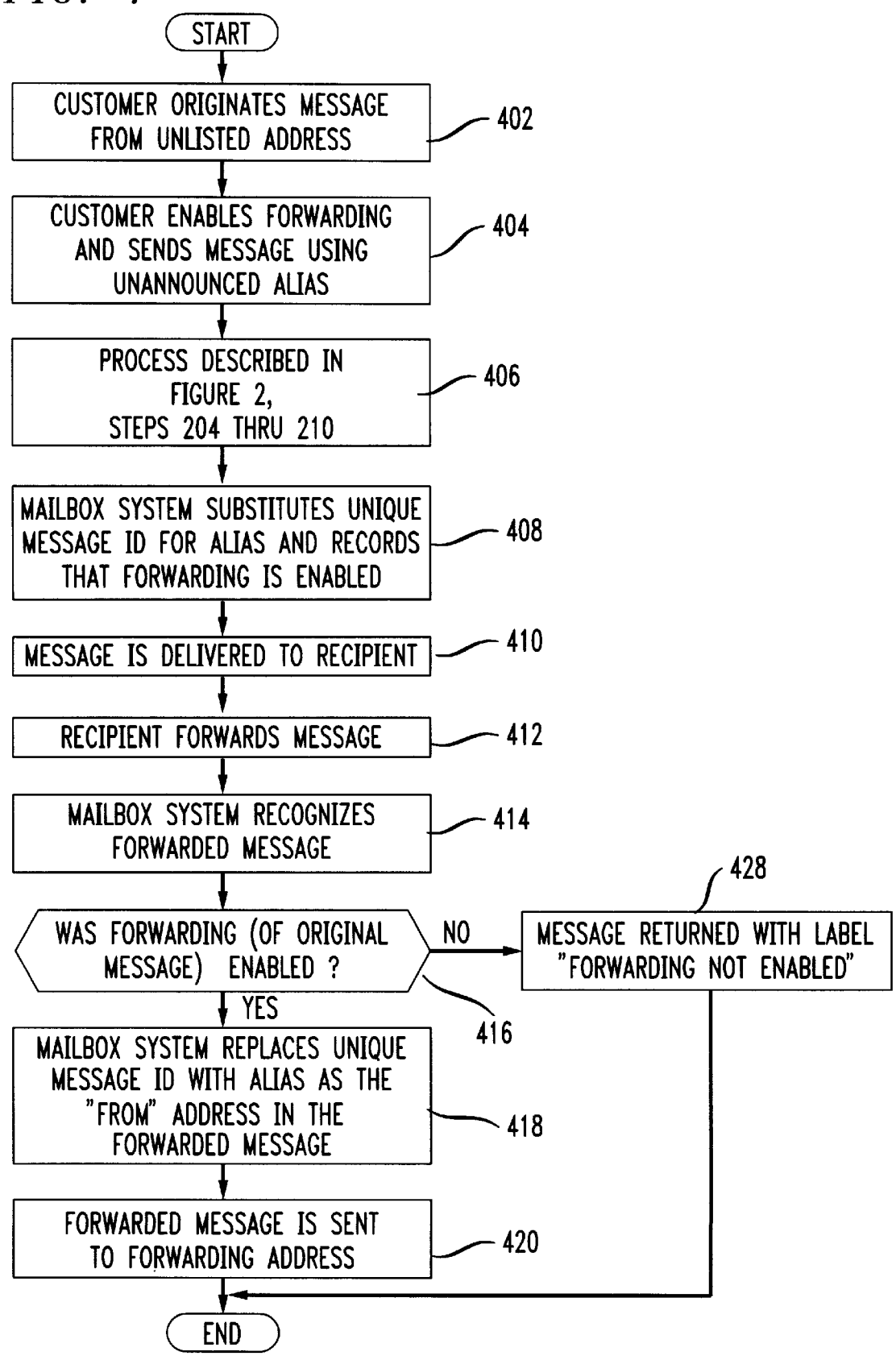
FIG. 4 is a flow diagram of a forwarded message process, in accordance with another aspect of the principles disclosed herein.

FIG. 4 is a flow diagram of a process, according to the principles of the present disclosure, in which a subscriber who has an unlisted address with which an unannounced alias address is associated, can permit message forwarding, while maintaining the identity of the originator and preserving the security and privacy of the unlisted address.

The process begins with step 402, in which a customer originates a message from an unlisted address. In step 404, the customer enables forwarding and sends the message using an unannounced alias address. The message is so marked by the local mailbox system. Step 406 is identical with steps 204 through 210 described earlier. In step 408, the mailbox system associated with the recipient (i.e., the local mailbox system) creates a unique message id which it uses to replace the unannounced alias address. It records the unique message id together with the unannounced alias address and the fact that forwarding is enabled. In step 410, the message carrying the unique message id in the "from" field is delivered to the recipient.

In step 412, the recipient chooses to forward the message to another recipient—and sends the message. The messaging system recognizes the forwarded message in step 414. In step 416, the messaging system checks whether forwarding was enabled by the originator of the message. If not, the message is returned to the recipient in step 428 with the label "forwarding not enabled." If forwarding was enabled, in step 418, the messaging system replaces the unique message id in the "from" field of the forwarded message with the original unannounced alias address, and in step 420 sends the message to the forwarding address. The message makes its way to the local mailbox system associated with the forwarding address, where the process repeats according to step 408.

The "unique message id" created by any local mailbox system carries the identity of the local mailbox system in the id. Thus, the messaging system can always handle a forwarded message by retrieving from the appropriate local mailbox system the unannounced alias address and forwarding enabled flag stored when the "unique message id" was generated. In an alternative implementation, the "forwarding enabled flag" can be encoded in the unique message (ID) created by the local mailbox system.

Figure 5:
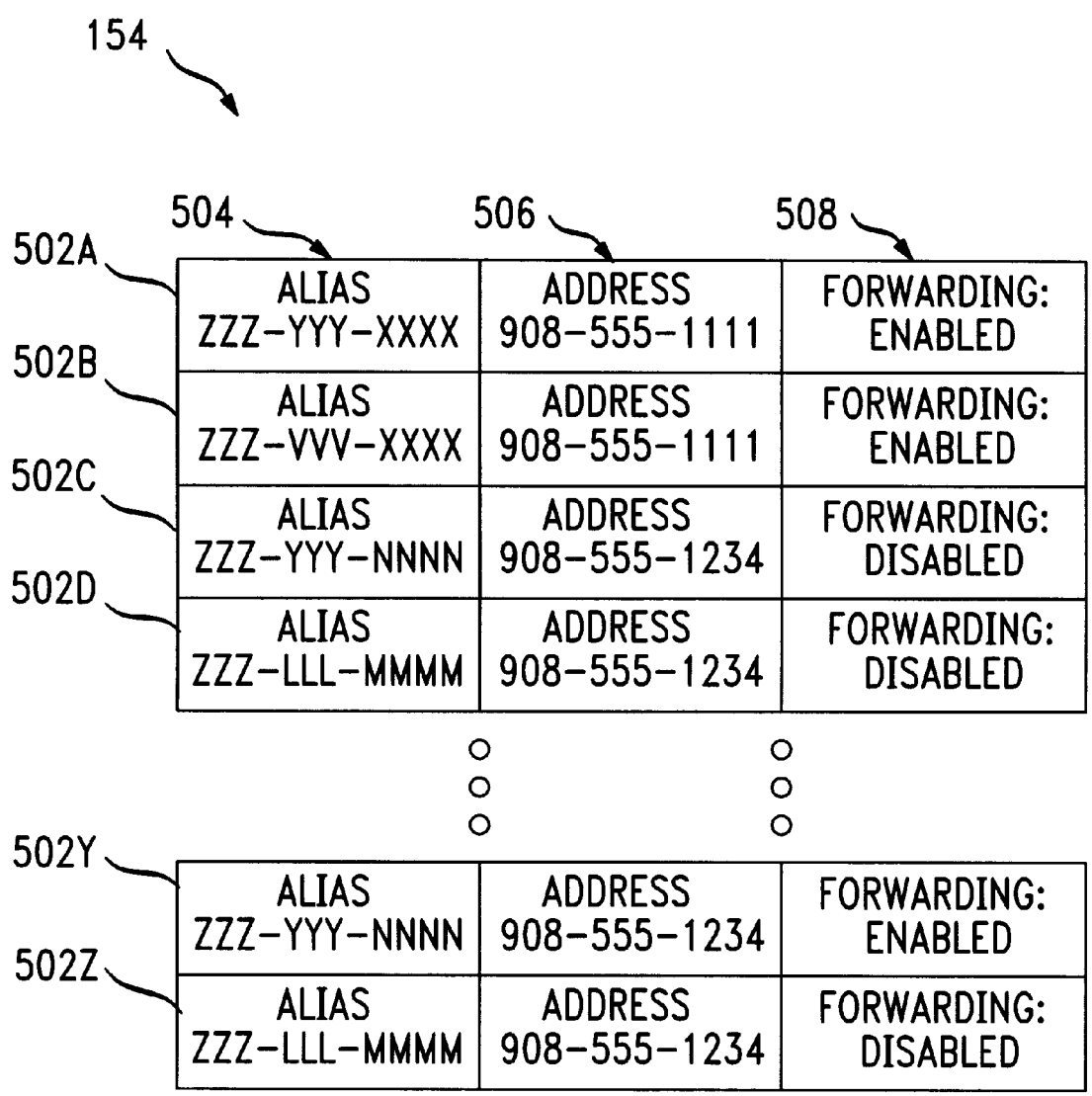
FIG. 5 is a format of a routing table of a mailbox system of the present disclosure, as shown in FIG. 1b.

An exemplary format of a routing table 154, shown in FIG. 1b, is shown in FIG. 5. Routing table 154 includes a plurality of entries, such as entries 502A–Z. Each entry includes an alias address field 504, an address field 506 and a forwarding field 508. Alias field 504 contains an alias address, either announced or unannounced. Address field 506 contains an unlisted address corresponding to the alias address. Forwarding field 508 contains an indicator of whether forwarding is enabled for the alias address in the corresponding alias field.

Whether or not an alias address is announced or unannounced is embedded in the coding of the alias address so that this is immediately recognizable by all local mailbox systems. As described above, the forwarding indicator is significant only for alias addresses which are unannounced.

A table similar to this routing table can be maintained by each local mailbox system wherein the columns are ALIAS, UNIQUE MESSAGE ID, and FORWARDING INDICATOR. The principles of this disclosure contemplate embodiments where a messaging system will keep one centralized table for all such data as well as embodiments where copies of a centralized ALIAS—UNLISTED ADDRESS table will be distributed and maintained together with ALIAS—UNIQUE MESSAGE ID tables.

The foregoing is to be construed as only being an illustrative embodiment of this disclosure. Persons skilled in the art can easily conceive of alternative arrangements providing functionality similar to this embodiment without any deviation from the fundamental principles of the teachings in this disclosure.

What is claimed is:

1. In a messaging system, communicatively coupled to a communication carrier network, comprising a mailbox system for transmitting and receiving messages and a routing database containing a routing table, a method of providing messaging services to unlisted addresses, comprising the steps of:

generating, in the messaging system, an alias address, responsive to instructions from a first party with an unlisted address;

entering the alias address and its corresponding unlisted address in a routing table;

responsive to receiving a message addressed to the alias address, looking up the alias address in the routing table to obtain the unlisted address; and delivering the message addressed to the alias address to the unlisted address wherein said alias address is unique and used one-time.

2. The method of claim 1, wherein the instructions comprise the origination of a message containing the unlisted address addressed to a recipient and the method further comprises the steps of:

substituting the alias address for the unlisted address in the message; and delivering the message containing the alias address to the recipient.

3. The method of claim 2, wherein the instructions comprise a request for an alias address and the method further comprises the steps of:

communicating the alias address to the first party.

4. The method of claim 1, wherein the message is selected from a group of messages which include a voice message, a data message, a facsimile message and a video message.

5. In a messaging system, communicatively coupled to a communication carrier network, comprising a mailbox system for transmitting and receiving messages and a routing database containing a routing table, a method of providing messaging services to unlisted addresses, comprising the steps of:

generating, in the messaging system, an alias address, responsive to origination of a message addressed to a recipient from a first party with an unlisted address, the message containing the unlisted address;

entering the alias address and its corresponding unlisted address in a routing table;

substituting the alias address for the unlisted address in the message;

delivering the message containing the alias address to the recipient;

responsive to receiving a reply message addressed to the alias address, looking up the alias address in the routing table to obtain the unlisted address; and delivering the message addressed to the alias address to the unlisted address wherein said alias address is unique and used one-time.

6. The method of claim 5, wherein the message is selected from a group of messages which include a voice message, a data message, a facsimile message and a video message.

7. In a messaging system, communicatively coupled to a communication carrier network, comprising a mailbox system for transmitting and receiving messages and a routing database containing a routing table, a method of providing messaging services to unlisted addresses, comprising the steps of:

generating, in the messaging system, an alias address responsive to a request for an alias address from a first party with an unlisted address;

entering the alias address and its corresponding unlisted address in a routing table;

communicating the alias address to the first part;

delivering the message containing the alias address to the recipient;

responsive to receiving a reply message addressed to the alias address, looking up the alias address in the routing table to obtain the unlisted address; and delivering the message addressed to the alias address to the unlisted address wherein said alias address is unique and used one-time.

8. The method of claim 7, wherein the message is selected from a group of messages which include a voice message, a data message, a facsimile message and a video message.

9. In a messaging system, communicatively coupled to a communication carrier network, comprising a mailbox system for transmitting and receiving messages and a routing database containing a routing table, a method of providing messaging services to unlisted addresses, comprising the steps of:

responsive to determining that a message originated by a first party with an unlisted address is forwardable:

generating an alias address in the messaging system;

entering the alias address, its corresponding unlisted address and an indication that the message is forwardable in a routing table;

substituting the alias address for the unlisted address in the message;

delivering the message to a first recipient;

delivering the message to a second recipient, responsive to a forwarding of the message by the first recipient;

responsive to receiving a message addressed to the alias address from the second recipient, looking up the alias address in the routing table to obtain the unlisted address; and delivering the message addressed to the alias address to the unlisted address wherein said alias address is unique and used one-time.

10. The method of claim 9, further comprising the step of:

communicating the alias address to the first party.

11. The method of claim 9, further comprising the steps of:

responsive to determining that a message originated by a first party with an unlisted address is not forwardable:

generating an alias address in the messaging system;

entering the alias address, its corresponding unlisted address and an indication that the message is not forwardable in a routing table;

substituting the alias address for the unlisted address in the message;

delivering the message to a first recipient; and blocking delivery of the message to a second recipient, responsive to a forwarding of the message by the first recipient.

12. The method of claim 11, further comprising the step of:

delivering the message to the unlisted address.

13. The method of claim 9, wherein the message is selected from a group of messages which include a voice message, a data message, a facsimile message and a video message.

14. A messaging system comprising:

a routing database containing a routing table; and a mailbox system, communicatively coupled to a communication carrier network, performing the steps of:

generating an alias address, responsive to instructions from a first party with an unlisted address entering the alias address and its corresponding unlisted address in the routing table;

responsive to receiving a message addressed to the alias address, looking up the alias address in the routing table to obtain the unlisted address; and delivering the message addressed to the alias address to the unlisted address wherein said alias address is unique and used one-time.

15. The system of claim 14, wherein the instructions comprise the origination of a message containing the unlisted address addressed to a recipient and the mailbox system further performs the steps of:

substituting the alias address for the unlisted address in the message; and delivering the message containing the alias address to the recipient.

16. The system of claim 15, wherein the instructions comprise a request for an alias address and the mailbox system further performs the steps of:

communicating the alias address to the first party.

17. The system of claim 14, wherein the message is selected from a group of messages which include a voice message, a data message, a facsimile message and a video message.

18. A messaging system comprising:

a routing database containing a routing table; and a mailbox system, communicatively coupled to a communication carrier network, performing the steps of generating an alias address, responsive to origination of a message addressed to a recipient from a first party with an unlisted address, the message containing the unlisted address;

entering the alias address and its corresponding unlisted address in a routing table;

substituting the alias address for the unlisted address in the message;

delivering the message containing the alias address to the recipient;

responsive to receiving a reply message addressed to the alias address, looking up the alias address in the routing table to obtain the unlisted address; and delivering the message addressed to the alias address to the unlisted address wherein said alias address is unique and used one-time.

19. The system of claim 18, wherein the message is selected from a group of messages which include a voice message, a data message, a facsimile message and a video message.

20. A messaging system comprising:

a routing database containing a routing table; and a mailbox system, communicatively coupled to a communication carrier network, performing the steps of generating an alias address responsive to a request for an alias address from a first party with an unlisted address;

entering the alias address and its corresponding unlisted address in a routing table;

communicating the alias address to the first party;

delivering the message containing the alias address to the recipient;

responsive to receiving a reply message addressed to the alias address, looking up the alias address in the routing table to obtain the unlisted address; and delivering the message addressed to the alias address to the unlisted address wherein said alias address is unique and used one-time.

21. The system of claim 20, wherein the message is selected from a group of messages which include a voice message, a data message, a facsimile message and a video message.

22. A messaging system comprising:

a routing database containing a routing table; and a mailbox system, communicatively coupled to a communication carrier network, responsive to determining that a message originated by a first party with an unlisted address is forwardable performing the steps of:

generating an alias address;

entering the alias address, its corresponding unlisted address and an indication that the message is forwardable in a routing table.

substituting the alias address for the unlisted address in the message;

delivering the message to a first recipient;

delivering the message to a second recipients, responsive to a forwarding of the message by the first recipient;

responsive to receiving a message addressed to the alias address from the second recipient, looking up the alias address in the routing table to obtain the unlisted address; and delivering the message addressed to the alias address to the unlisted address wherein said alias address is unique and used one-time.

23. The system of claim 22, wherein the mailbox system further performs the step of:

communicating the alias address to the first party.

24. The system of claim 23, wherein the mailbox system, responsive to determining that a message originated by a first party with an unlisted address is not forwardable, further performs the steps of:

generating an alias address in the messaging system;

entering the alias address, its corresponding unlisted address and an indication that the message is not forwardable in a routing table;

substituting the alias address for the unlisted address in the message;

delivering the message to a first recipient; and blocking delivery of the message to a second recipient, responsive to a forwarding of the message by the first recipient.

25. The system of claim 24, wherein the mailbox system further performs the step of:

delivering the message to the unlisted address.

26. The system of claim 22, wherein the message is selected from a group of messages which include a voice message, a data message, a facsimile message and a video message.

27. A system for providing messaging services to subscribers comprising:

a plurality of local mailbox systems arranged to transmit and receive messages via a communication carrier network;

a routing database which contains a routing table and which is coupled to said mailbox systems;

means responsive to receiving a message which is originated by a first subscriber with an unlisted address and which is destined for one or more recipients, for querying said database to determine whether said first party wishes to keep the unlisted address unannounced to said one or more recipients;

means for generating a unique message ID and for substituting said unique message ID for the unlisted address upon ascertaining that said first subscriber wishes to keep the unlisted address unannounced;

means for storing said unique message ID in said routing table; and means for delivering the message to said one or more recipients with the unique message ID as the originating address wherein the unique message ID is used one-time.

28. The system of claim 27 further comprising means for receiving within one of said local mailbox systems one or more responses for said message from said one or more of said recipients;

means for mapping said unique message ID to said unlisted address;

means for delivering said response to said first party; and means for deleting said unique message ID from said first subscriber so that no further response can be delivered to said first subscriber.

29. The system of claim 27 further comprising means for blocking delivery of responses received from parties who are not recipients of said message.

30. A method of providing messaging services to subscribers comprising the steps of:

receiving at one of a plurality local mailbox systems, a message which is originated by a subscriber with an unlisted address and which is destined for one or more recipients;

querying a routing database which is coupled to said mailbox systems to determine whether said subscriber wishes to keep the unlisted address unannounced to said one or more recipients;

generating a unique message ID for substituting said unique message ID for the unlisted address upon ascertaining that said subscriber wishes to keep the unlisted address unannounced;

storing said unique message ID in said routing table; and delivering the message to said one or more recipients with the unique message ID as the originating address wherein the unique message ID is used one-time.

31. The method of claim 30 further comprising the steps of:

receiving within one of said local mailbox systems one or more responses for said message originated from said one or more of said recipients and destined for said subscriber;

mapping said unique message ID to said unlisted address in a header of said one or more responses;

delivering said one or more responses to said subscriber; and deleting said unique message ID from said first subscriber so that no further response can be delivered to said subscriber.

32. The system of claim 30 further comprising the step of:

blocking delivery of responses received from parties who are not recipients of said message.

33. An article of manufacture:

a program medium executable in a computer system for transmitting and receiving messages in a mailbox system providing messaging services to unlisted addresses, the program medium comprising:

program instructions for generating, in the messaging system, an alias address, responsive to instructions from a first party with an unlisted address;

program instruction for entering the alias address and its corresponding unlisted address in a routing table;

program instructions responsive to receiving a message addressed to the alias address, looking up the alias address in the routing table to obtain the unlisted address; and program instructions for delivering the message addressed to the alias address to the unlisted address wherein said alias address is unique and used one-time.

34. An article of manufacturing:

a program medium executable in a computer system for transmitting and receiving messages in a mailbox system providing messaging services to unlisted addresses, the program medium comprising:

program instructions for generating, in the messaging system, an alias address, responsive to origination of a message addressed to a recipient from a first party with an unlisted address, the message containing the unlisted address;

program instructions for entering the alias address and its corresponding unlisted address in a routing table;

program instructions for substituting the alias address for the unlisted address in the message;

program instructions for delivering the message containing the alias address to the recipient;

program instructions responsive to receiving a reply message addressed to the alias address, looking up the alias address in the routing table to obtain the unlisted address; and program instructions for delivering the message addressed to the alias address to the unlisted address wherein said alias address is unique and used one-time.

35. A program medium executable in a computer system for transmitting and receiving messages in a mailbox system providing messaging services to unlisted addresses, the program medium comprising:

program instructions responsive to receiving a message which is originated by a first subscriber with an unlisted address and which is destined for one or more recipients, for querying a database to determine whether said first party wishes to keep the unlisted address unannounced to said one or more recipients;

program instructions for generating a unique message ID and for substituting said unique message ID for the unlisted address upon ascertaining that said first subscriber wishes to keep the unlisted address unannounced;

program instructions for storing said unique message ID in said routing table; and program instructions for delivering the message to said one or more recipients with the unique message ID as the originating address wherein the unique message ID is used one-time.

36. A program medium executable in a computer system for transmitting and receiving messages in a mailbox system providing messaging services to unlisted addresses, the program medium comprising:

program instructions for receiving at one of a plurality local mailbox systems, a message which is originated by a subscriber with an unlisted address and which is destined for one or more recipients;

program instructions for querying a routing database which is coupled to said mailbox systems to determine whether said subscriber wishes to keep the unlisted address unannounced to said one or more recipients;

program instructions for generating a unique message ID for substituting said unique message ID for the unlisted address upon ascertaining that said subscriber wishes to keep the unlisted address unannounced;

program instructions for storing said unique message ID in said routing table; and program instructions for delivering the message to said one or more recipients with the unique message ID as the originating address wherein the unique message ID is used one-time.

* * * * *